(12) United States Patent
Sowle et al.

(10) Patent No.: US 11,060,829 B1
(45) Date of Patent: *Jul. 13, 2021

(54) GUIDANCE SYSTEM AND METHOD FOR GUIDING PROJECTILES

(71) Applicant: Orbital Research Inc., Cleveland, OH (US)

(72) Inventors: Zak Sowle, Bellbrook, OH (US); Srikanth Vasudevan, Monroe, CT (US); Matthew C. Birch, Madison, AL (US)

(73) Assignee: Orbital Research Inc, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,420

(22) Filed: Dec. 18, 2019

Related U.S. Application Data

(63) Continuation of application No. 16/233,484, filed on Dec. 27, 2018, now Pat. No. 10,545,012, which is a continuation of application No. 15/907,541, filed on Feb. 28, 2018, now Pat. No. 10,203,188, which is a continuation of application No. 12/942,995, filed on Nov. 9, 2010, now Pat. No. 9,939,238.

(60) Provisional application No. 61/259,616, filed on Nov. 9, 2009.

(51) Int. Cl.
| | |
|---|---|
| *F42B 10/26* | (2006.01) |
| *B64C 13/00* | (2006.01) |
| *F42B 10/00* | (2006.01) |
| *F42B 10/14* | (2006.01) |

(52) U.S. Cl.
CPC ............ *F42B 10/26* (2013.01); *B64C 13/00* (2013.01); *F42B 10/00* (2013.01); *F42B 10/14* (2013.01)

(58) Field of Classification Search
CPC .......... F42B 10/26; F42B 10/00; B64C 13/00
USPC ........ 244/21, 22, 3.1, 3.21, 3.22, 3.23, 3.24, 244/3.13, 3.11, 3.27
See application file for complete search history.

(56) References Cited

U.S. PATENT DOCUMENTS

| | | | | |
|---|---|---|---|---|
| 3,014,675 A | * | 12/1961 | Lewis | ..................... B64C 13/00 244/76 R |
| 5,379,968 A | * | 1/1995 | Grosso | .................. F42B 10/661 244/3.21 |
| 5,425,514 A | * | 6/1995 | Grosso | .................... F41G 3/145 244/3.22 |
| 6,422,507 B1 | * | 7/2002 | Lipeles | .................. F41G 7/305 102/501 |

(Continued)

*Primary Examiner* — Richard R. Green
*Assistant Examiner* — Michael A. Fabula
(74) *Attorney, Agent, or Firm* — Brian Kolkowski

(57) ABSTRACT

A projectile incorporates one or more spoiler-tabbed spinning disks to effect flow around the projectile and thus impart steering forces and/or moments. The spoiler tabs may be deployed only during steering phases of travel thus minimizing the drag penalty associated with steering systems. The disks are driven by motors and informed and controlled by sensors and electronic control systems. The spoiler tabs protrude through the surface of the projectile only for certain angles of spin of the spinning disk. For spin-stabilized projectiles, the disks spin at substantially the same rate as the projectile, but the disks may function in fin-stabilized projectiles as well. Any number of such spinning flow effector disks may be incorporated in a projectile, with the manner of functional coordination differing slightly for even and odd numbers of disks.

20 Claims, 12 Drawing Sheets

(56) References Cited

U.S. PATENT DOCUMENTS

| | | | |
|---|---|---|---|
| 6,685,143 B1* | 2/2004 | Prince | B64C 5/12 244/203 |
| 7,163,176 B1* | 1/2007 | Geswender | F42B 10/64 102/400 |
| 8,190,305 B1* | 5/2012 | Prince | G05D 1/107 244/175 |
| 9,939,238 B1* | 4/2018 | Sowle | F42B 10/26 |
| 10,203,188 B1* | 2/2019 | Sowle | B64C 13/00 |
| 10,545,012 B1* | 1/2020 | Sowle | F42B 10/14 |

* cited by examiner

Initial Condition    Desired Turning Plane

OMD

Phase Shift to Orientation

Phase Shift to Orientation

Net Force

Net Force

Orientation of Maximum Deployment (OMD)

GUIDANCE SYSTEM AND METHOD FOR GUIDING PROJECTILES

CROSS REFERENCE TO RELATED APPLICATIONS

This application is a continuation of U.S. patent application Ser. No. 16/233,484 which was filed on Dec. 27, 2018, and which is a continuation of U.S. patent application Ser. No. 15/907,541 which was filed on Feb. 28, 2018 and issued as U.S. Pat. No. 10,203,188 on Feb. 12, 2019, and which is a continuation of U.S. patent application Ser. No. 12/942,995 which was filed on Nov. 9, 2010 and issued as U.S. Pat. No. 9,939,238 on Apr. 10, 2018, and which is non-provisional application claiming benefit to provisional U.S. Patent application Ser. No. 61/259,616 which was filed on Nov. 9, 2009.

STATEMENT REGARDING FEDERALLY-SPONSORED RESEARCH OR DEVELOPMENT

The U.S. Government has a paid-up license in this invention and the right in limited circumstances to require the patent owner to license to others on reasonable terms provided for by the terms of Small Business Innovation Research Phase II contract number W15QKN-08-C-0012 awarded by the U.S. Army.

BACKGROUND OF THE INVENTION

1. Field of the Invention

The present invention relates to control of spinning projectiles. More particularly, the invention relates to a miniature control actuation system for active flow control on the forebody, aft or mid section of an artillery projectile, missile, munition or other projectile or slender body. In combination with a guidance and control system, the present invention will enhance the performance of guided projectiles or be capable of transforming unguided projectiles into low-cost guided projectiles.

2. Technical Background

The targeting precision of weaponized projectiles is often discussed in terms of the circular error probable (CEP), a statistical metric having units of distance, sometimes mathematically defined as the square root of the mean square error (MSE) for some sample of multiple projectile round landings, and geometrically approximated to mean the radius of a circle with its center at a target inside which 50% of rounds fired will land. For certain combat operations, a 50-meter CEP may be considered acceptable, whereas a 10-meter CEP may be preferred for operations in densely packed areas in order to ensure that targets are precisely hit and to avoid collateral damage.

The CEP for a conventional (i.e., unguided) projectile is dependent on the range at which the projectile is fired. For example, an M549A1 high-explosive rocket assisted (HERA) projectile fired at a range of 5-10 kilometers from a target will generally have a CEP of 50 meters or less, whereas the CEP for such a projectile fired at a distance of 30 kilometers from the target may be as much as 260 meters. It is desirable to improve the CEP of conventional projectiles by incorporating guidance systems which steer the projectiles towards targets that are specified by laser, GPS, infrared, or any other targeting means known in the art. Reducing the CEP of a projectile weapon can improve enemy kill rates, reduce the time spent in a conflict with an enemy, reduce collateral damage, and reduce the total cost of ordnance used by reducing the number of projectiles that must be fired. Especially desirable is to provide guidance for low-cost conventional projectiles such as mortars and artillery rounds. For example, the U.S. Army's 2009 Operational Needs Statement from Afghanistan (ONS-09-7722), herein incorporated by reference, specifies a GPS-guided 120 mm mortar with a CEP of 5 meters or less for a range of 7 kilometers. Despite advances in this technology area, such a projectile has not yet been fully developed, tested and deployed.

Guided projectiles can be classified as being fin-stabilized or spin-stabilized. Fin-stabilized projectiles use aerodynamic surfaces mounted to the body of the projectile to provide stabilization against the natural tumbling behavior of a slender-body projectile. Spin-stabilized projectiles use the gyroscopic effect of the spinning body of the round to counter the natural tumbling behavior of a slender-body projectile. Spin-stabilized artillery projectiles offer the lowest cost airframe approach for precision munitions. Existing approaches for providing guidance on spin-stabilized projectiles suffer from the need to decouple the spin of the projectile from that of the control surfaces. This creates the need for complex and expensive acceleration-hardened ("g-hard") bearing systems that drive the overall system cost and reduce the gyroscopic stability of the airframe through frictional losses.

To maneuver a spin-stabilized projectile without decoupling the control surfaces, the steering system must provide a sufficient level of force and moment input to re-point the nose of the projectile into a direction that the projectile would not normally assume, and the steering system must be able to apply and remove the force and moment rapidly enough that the only forces and moments seen by the projectile are in the direction of the desired steering. This can be difficult in a spin-stabilized projectile because the mechanical movement of the steering system mechanism must be large enough to generate the forces and moment needed for effective steering, yet small enough to achieve the rapid application and removal of the forces as the projectile spins. In other words, the mechanical movement must be sufficiently large to generate sufficient forces to maneuver the projectile but able to deploy and retract the steering system in order to precisely maneuver the projectile towards the desired endpoint. If the steering system mechanisms are not timely activated and removed in coordination with the spin of the projectile, they will create forces that may counterproductively manifest as undesired motion of the projectile.

It is therefore the object of the present invention to provide a miniature control actuation system that provides directional active flow control to a projectile without the need for decoupling the spin of any components. It is further the object of the present invention to provide a device or system that provides low cost, low power, space-efficient precision guidance and control.

3. Description of Related Art

Slender-body projectile guidance methods can be generally classified as 1-D and 2-D methods. 1-D methods guide the projectile only by speeding or slowing the projectile, as with added or reduced propulsion or by increasing or reducing the drag forces exerted on the projectile. 2-D guidance methods steer the projectile by re-orienting the projectile into a new direction of travel. Prior attempts in the art to provide control to spinning projectiles include systems and methods described in U.S. Pat. Nos. 4,565,340, 4,568,039, 5,379,968, 5,425,514, 5,647,558, 6,135,387, 6,502,786 B2, 6,981,672 B2, 7,354,017 B2, and 7,584,922 B2. U.S. Patent Application Publication 2009/0283627 A1 provides braking to a projectile. All of these disclosures are herein incorporated by reference. Most of these systems use canards as the flow effectors and some rely on rotationally decoupling the roll of a guidance unit at the munition forebody from the roll of the rest of the munition body. This rotational decoupling is accomplished by means either of anti-spin canards, which introduce drag, or by motor power, increasing the weight and power requirements of the munition; either case presents undesirable disadvantages while adding cost.

What is known as a "precision guidance kit" (PGK), or as a "course correcting fuze" (CCF), is a fuze, intended to replace standard nose fuzes used with conventional artillery ammunition (105 mm and 155 mm), that works to provide persistent course correction to improve circular error probable (CEP) distances. These guidance kits have been proposed for mortars as well. Some nose guidance kit systems rely on despinning the entire projectile during a phase of flight in which guidance control is provided by the guidance kit. These systems can have the advantage of improving the accuracy of the conventional artillery or mortar ammunition inventory without having to modify the body of the projectiles.

Various modifications to a projectile to include precision guidance have also been employed on 120 mm mortars, such as the Saab Bofors Dynamics STRIX, the XM395 Precision Guided Mortar Munition (PGMM) by Alliant Techsystems and another PGMM by BAE Systems. In these and other cases, one time use, single-fire side rocket thruster(s) are utilized to provide terminal guidance by supplying the corrective forces required for course correction. These thrusters have the disadvantage that they can only be used once and are only useful in the final phase of flight.

What is thus needed is a novel miniature control actuation system that can provide precision guidance to existing mortars, artillery rounds and similar projectiles, but which has improved capabilities over the existing systems, and can provide lower CEP at longer ranges. It is therefore the object of the present invention to provide a miniature control actuation system that can be used with existing and future munitions, and can function throughout projectile flight, at any phase of projectile flight, that is not limited to one-shot use, that does not introduce undue drag on the projectile during non-steering phases of flight, that can be employed in both fin-stabilized and spin-stabilized projectiles, that maximizes range, reduces weight, and minimizes the power requirements of the projectile, and which can improve CEP beyond the improvement gained by existing munitions guidance systems.

SUMMARY OF THE INVENTION

This patent application discloses a novel miniature control actuation system for active flow control on the forebody, aft or mid section of an artillery projectile, missile, munition or other projectile or slender body that needs greater precision and/or accuracy. The system of the present invention is designed to convert conventional gun-fired munitions into guided munitions, or to enhance the performance of guided projectiles, by replacing or enhancing the performance of traditional control surfaces. The embodiments of the system described herein provide low cost, low power, space-efficient control effectors that are ideal for in-flight precision control of certain gun- and mortar-launched projectiles. Key benefits of projectiles enabled with the system of the present invention include improved (reduced) circular error probable, increased range, increased lethality, enhanced precision strike capability, reduced friendly-force casualties, and a larger maneuver footprint for target prosecution.

The system of the present invention is a low-cost steering system for projectiles. Such projectiles may comprise, for example, 40 mm rounds, 60 mm, 81 mm and 120 mm mortars, 105 mm or 155 mm artillery projectiles, or self-propelled projectiles such as missiles or torpedoes. The system is enabled through the use of active flow control technologies that allow control of large-scale aerodynamic flows using small-scale actuators. Compared to conventional steering systems that use servo-controlled fins and canards, the system of the present invention enhances traditional control surfaces or provides additional control ability while simplifying the design and integration of the weapon's control actuation systems. Further, given the small size, the system of the present invention also reduces power and volume requirements for control of projectiles. As an advanced steering system, the system of the present invention also provides a persistent source of in-flight course-correcting forces with lower drag penalty and high payload capacity, delivering more lethality.

The system of the present invention is based on a family of control actuation systems for many different applications. The system of the present invention may benefit the control authority and steering of gun-fired munitions, artillery projectiles, active countermeasures, mortar rounds, munitions, grenades, extended aerial protection projectiles, bullets, missiles, cruise missiles, fixed-wing aircraft, torpedoes, hybrid munitions, and like type of devices or craft that may or may not rotate along a longitudinal axis as they travel through a fluid toward a target and/or in avoidance of a threat or unwanted collision. The present invention will also benefit next generation, steerable platforms and hybrid munitions and projectiles that may be capable of transforming in flight and/or that may also contain a rocket motor. For the purposes of this disclosure and the appended claims, the words, "projectile," "munition," and "round" shall expressly be construed as meaning any such device or craft.

Using the system of the present invention, traditional munitions transform into low-cost smart munitions with high precision capability in line of sight and beyond line of sight engagements, providing limited collateral damage, reduced volume of fire per engagement, and greater lethality. By integrating the system of the present invention into traditional munitions platforms, a more affordable precision strike projectile is achieved.

As an alternative to integrating the system of the present invention into the forebody, mid or aft section of a weapon system, the actuators of the present invention can be integrated into a nose or tail kit that enables enhanced performance in existing non-guided rounds. The system of the present invention can be implemented via a replaceable nose or tail kit, creating a precision guidance kit for existing and future rounds.

A desirable feature of miniature control actuation system of the present invention not found in other projectile guidance technologies is its operability in both spin-stabilized and fin-stabilized projectiles. Traditional spin rates of around 360 hertz are a major impediment for steering systems on spin-stabilized projectiles. The approach taken in spin-stabilized projectiles is to deploy flow control spoilers at the same rate of spin as the projectile. Theses spoilers are included onto a spinning disk. Control authority is attained by timing the rotation of these spinning disks with spoilers such that the direction and phasing of the spoiler deployment is controlled relative to inertial space. Since the spinning disks rotate at a frequency matched to the projectile spin frequency, the spoiler feature will be maximally deployed at the same point during each revolution of the spin stabilized projectile. Additionally, the rotational direction of the spinning disks is opposite that of the spin-stabilized projectile to provide localized insertion of the spoilers into the airstream. Thus, the spinning disks of the present invention will create known aerodynamic forces at the high rate of speed needed for directional control authority on spin-stabilized projectiles.

By using internal spinning disks to actuate the spoilers, the system of the present invention achieves high frequency extend/retract with relatively low power requirements, and much lower risks as compared with linear oscillating actuators. The use of small disk masses mitigates power required for startup and phase change-based control operations. After the disks spin up, there is only a very slight reduction in gyroscopic stability of the projectile due to the relatively much smaller spinning mass of the spoiler and actuation rotor. Change in gyroscopic stability contribution is further minimized through a unique design and the use of lightweight materials in the spinning disks. The use of lightweight materials also may allow the system to use multiple spin-up/spin-down cycles. Multiple spin-up/spin-down cycles may prove beneficial for various platforms. In addition to improved spin-up/spin-down performance, use of lightweight materials may allow for a thicker and stiffer spinning disk that is less susceptible to bending due to aerodynamic forces on the spoiler surface. Additionally, a typical spinning disk with a spoiler is symmetric if split in half. For the spinning disks with a spoiler, the two halves (circular non-spoiler section and the spoiler section) should have the same mass properties and the same mass moments of inertia. The present invention alleviates/minimizes the torque ripple experienced by motors driving the spinning disks by optimizing the design of the spinning disks as well as utilizing robust control algorithms.

The advanced algorithms of the present invention utilize and process sensor input(s) along with the desired projectile path. In doing so, the deployment positions of the spoiler on a spinning disk are changed by synchronizing or shifting the phase of the spinning disk with respect to the spin of the projectile. Thus, the control authority is attained by timing the rotation of disks such that the direction and phasing of the spoiler deployment is controlled relative to inertial space.

The system of the present invention preferably improves the CEP of a projectile that uses it to better than 50 meters. More preferably, the use of the system of the present invention improves CEP to better than 10 meters. Even more preferably, CEP is reduced to better than 5 meters. More preferably still, CEP becomes less than 3 meters. Most preferably, CEP is reduced to within 1 meter. Monte Carlo simulations that have been conducted indicate that use of the system of the present invention in an M913 105 mm artillery projectile improves CEP to 2.84 meters from 111 meters for an unguided M913 artillery round at a firing range of 18 kilometers. The simulations took into account random system error values to represent launch condition uncertainties, mass property uncertainties, aerodynamic uncertainties, and 2 hours old meteorological data.

For embodiments in which the system of the present invention is implemented as a replacement fuze for a round, the system of the present invention with the appropriate guidance and control system preferably has an average unit production cost of less than $10,000 (in 2010 U.S. dollars).

In some embodiments, the present invention comprises a guided projectile having an outer surface, the guided projectile comprising at least one spinning disk having an axle, the spinning disk comprising or being asymmetrically shaped to comprise at least one flow-effecting spoiler, the axle of the spinning disk being positioned within the projectile such that, by the rotation of the spinning disk, the spoiler deploys to protrude from the outer surface of the guided projectile only for some angles of spin of the spinning disk so as to exert a steering force and/or moment on the guided projectile. When the guided projectile comprises an even number of such spinning disks two or greater, preferably, the spoilers are preferably deployed periodically by the spinning of the disks, and the orientation of the periodic deployment of the spoilers is such that each spoiler maximally deploys normal to a desired turning plane and one flow effector disk's phase is shifted positive and an opposite flow effector disk's phase is shifted negative, resulting in a net steering force and/or moment on the guided projectile. When the guided projectile comprises an odd number of such spinning disks three or greater, the spoilers are preferably deployed periodically by the spinning of the disks, and the orientation of the periodic deployment of the spoilers is such that at least some of the spoilers are in turn maximally deployed parallel to a desired turning plane. The projectile may be a spin-stabilized projectile or a fin-stabilized projectile, and in the latter case, preferably, at least one spinning disk spins up from being stopped in the reference frame of the spin-stabilized projectile to spinning at substantially the same rate as the projectile within a few milliseconds.

The present invention can also be embodied in an on-demand projectile control actuation system comprising one or more asymmetric spinning disks oriented normal to the direction of travel of the projectile, wherein the disks are disposed to rotate beneath the surface of a projectile, such that portions of the rotating disks protrude above the surface of the projectile so as to affect flow around the surface of the projectile. Preferably, the protruding disks rotate at a frequency matched to the projectile spin frequency, and spin up from being stopped in the reference frame of the projectile to spinning at substantially the same rate as the projectile within a few milliseconds (if the projectile is spinning).

Another embodiment of the present invention is a complete fuze kit, or nose kit, or tail kit, which incorporates and comprises the basic spinning disk components (spinning disks comprising spoiler tabs and counterweights, motors, sensors, bearings, a battery or other power source, control electronics) and also optionally other sensors and systems to assist in guidance and control of the projectile, such as a radome, optical or infrared sensors, gyroscopes and/or accelerometers (preferably MEMS-based), telemetry system(s), computers, etc. Preferably, the kit of this embodiment is built ready to screw into or otherwise attach to existing or future munitions, mortar rounds, artillery rounds, etc. of standard sizes so as to replace traditional such kits. Such a complete, modularized guidance and control solution would present an especially appealing advantage of being able to turn a "dumb" projectile into a "smart" projectile for a relatively low cost.

The present invention is also embodied in a method of steering a spin-stabilized projectile comprising spinning up at least one asymmetric spinning disk comprising or shaped to comprise a flow-effecting spoiler to substantially the same rotational speed as the spin of the projectile, the spinning disk being housed within the projectile and oriented normal to the direction of travel; and adjusting the speed of the spin of the at least one spinning disk such that the flow-effecting spoiler is maximally deployed to protrude outside of the outer surface of the projectile during a desired phase of rotation of the projectile such that a steering force or moment is exerted on the projectile. This method may optionally further comprise the step of first determining that a threshold amount of course correction is required prior to spinning up the at least one asymmetric spinning disk, and/or may optionally further comprise the additional steps of determining that a steering of the projectile has been completed or that no further course correction of the projectile is required; and braking and/or locking the at least one spinning disk to a stop such that the flow-effecting spoiler is not deployed outside of the outer surface of the projectile. In the latter case the method may also optionally further comprising the additional steps of determining that a threshold amount of course correction is required; again spinning up the at least one asymmetric spinning disk to substantially the same rotational speed as the spin of the projectile; and adjusting the speed of the spin of the at least one spinning disk such that the flow-effecting spoiler is deployed to protrude outside of the outer surface of the projectile during a desired phase of rotation of the projectile such that a steering force or moment is exerted on the projectile. So as to reduce as much as possible the amount of torque ripple experienced by the disk and the motor which drives it, further preferably the spinning disk (having a flow-effecting spoiler half and a counterbalance half) is both simple mass balanced and the mass distribution of the spoiler half and the counterbalance half results in zero moment about the disk center when integrated in the rotating reference frame of the projectile for all orientations of the disk relative to the body of the projectile.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DESCRIPTION OF THE PREFERRED EMBODIMENTS

Figure 1A:
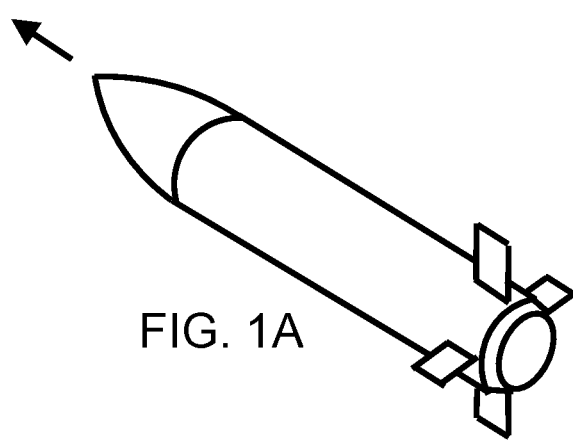
FIG. 1A illustrates a fin-stabilized projectile.
Figure 1B:
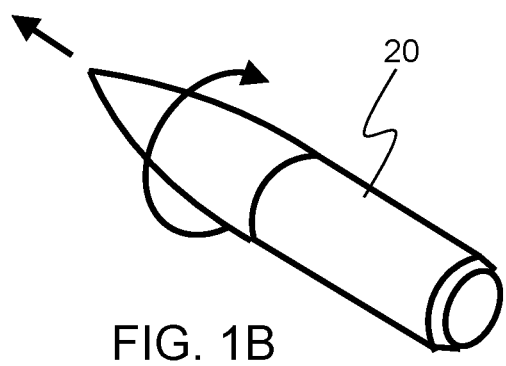
FIG. 1B illustrates a spin-stabilized projectile.

The system of the present invention accomplishes large mechanical movement of the steering system and rapid application and removal of the steering system control forces by utilizing a spinning disk actuator that achieves the combination of large displacement and high frequency required. The system of the present invention may be integrated into a projectile 20 or supplied as a replacement nose kit or tail kit that modularly integrates with an existing projectile. The present invention may be used with a fin-stabilized projectile, as shown in FIG. 1A, or with a spin-stabilized projectile, as shown in FIG. 1B. In these figures the straight arrows represent the direction of travel of the projectiles, and the curved arrow in FIG. 1B represents the direction of spin of the projectile 20.

Some embodiments of the system of the present invention constitute an on-demand control actuation system comprising asymmetric spinning disks oriented normal to the direction of travel, rotating below the surface of a spinning projectile, such that portions of the rotating disks protrude above the surface of the projectile so as to affect flow. The protruding disks rotate at a frequency matched to the projectile spin frequency to create deployable flow effectors at the high rate needed for spin-stabilized projectiles.

In some embodiments of the present invention, the system of the present invention consists of two or more flow effector disks each comprised of three major components, two or more control systems each comprised of two major components, a sensor to determine the projectile spin frequency and spin orientation and a control algorithm implemented for each control system either in analog circuit components or as software on a digital micro-controller.

Each flow effector disk comprises three major components and several smaller components. The three major components are (1) the spoiler, (2) the disk itself, and (3) the counterweight. In some embodiments of the system the spoiler and main disk are one mechanical piece; they are differentiated only because they perform different functions. Likewise, the counterweight may be fabricated as part of the disk itself, by using denser or thicker material on the counterweight half of the disk. The disk(s) of the present invention may be made of any suitable material known in the art; in some embodiments, preferably, the disks are made of aluminum metal or other lightweight, rigid material.

Figure 2A:
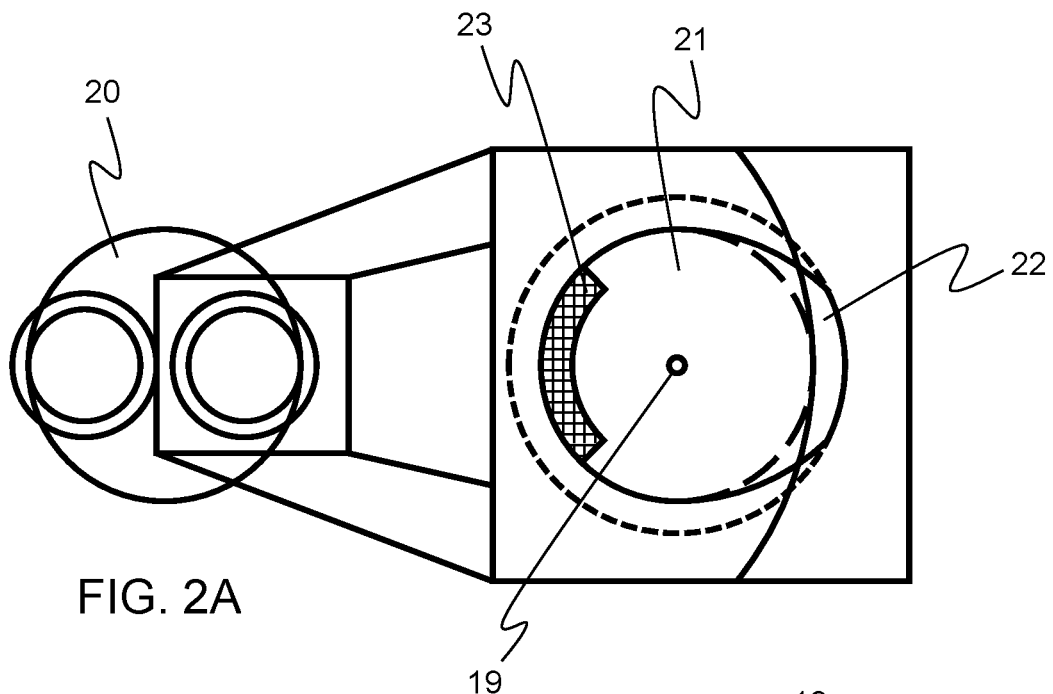
FIG. 2A illustrates a flow effector disk as a cross-section of a projectile.
Figure 2B:
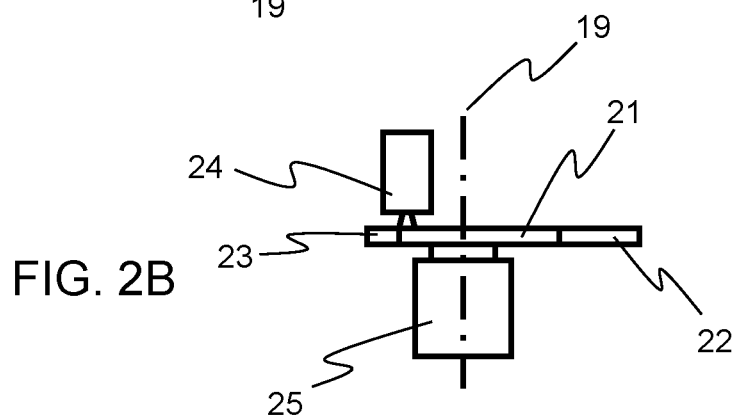
FIG. 2B illustrates the flow effector disk mechanism as shown from above.
Figure 2C:
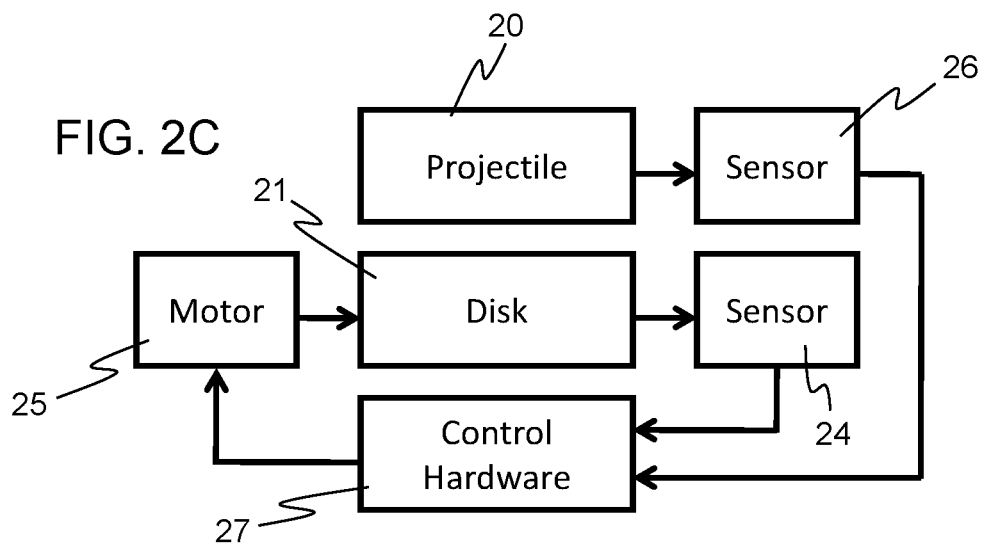
FIG. 2C is a block diagram of the flow effector disk frequency/phase-based control architecture.

FIG. 2A shows a flow effector disk 21 as a cross-section of a projectile 20. As depicted spoiler 22 is fully or maximally deployed and counterweight 23 is opposite spoiler on disk 21. Disk is mounted to projectile at axis 19. FIG. 2B shows the flow effector disk mechanism as shown from above. The disk is spun by motor 25, and sensor 19 detects the frequency/phase of the spinning disk. FIG. 2C is a block diagram of the flow effector system's frequency/phase based control architecture, which is not only informed by disk sensor 24 but also by another sensor or device 26 that provides information about the position, orientation, spin, steering objectives, etc. of the projectile 20.

The flow effector disk must be designed such that across the antisymmetric plane the mass and center of mass distance is equal. Because the flow effector disks rotate around an axis parallel, but not coincident, to the projectile spin axis, they see a radial acceleration gradient. Flow effector disks without the antisymmetric mass and moment arm balance will see a torque ripple in the motor. This torque ripple may be used as a mechanism to determine the spin frequency and orientation of the flow effector disk, but significant torque ripple may cause degraded system performance. Disk design considerations to reduce torque ripple are discussed in greater detail later in this disclosure and with illustration in FIG. 11.

During the initial flight phase of the projectile, prior to spin-up of the flow effector disks, each flow effector disk is locked relative to the rotational frame of the projectile. After spin-up (also called de-spinning), each flow effector disk rotates relative to the rotational frame of the projectile, not relative to an arbitrary ground-fixed reference frame. Flow effector disk spin frequency and spin orientation are given in the body fixed spinning reference frame. Spoiler deployment orientation can be translated through the body spin rate reference frame to the ground fixed reference frame to determine the actual turn plane orientation in terms of up, down, left and right.

Since a spoiler is that part of a disk that has a maximum radius greater than the disk's minimum radius over some fraction—preferably less than one half—of the circumference of the disk, and since a spoiler is deployed by rotating the disk such that the spoiler protrudes through the outer surface of the projectile, it will be appreciated that the disk's protrusion will not be instantaneous but instead will have a duty cycle, i.e., "deployment," even if it is only partial, will constitute some fraction of the full rotation of the disk. The word "deployed" as used in this disclosure should, then, be interpreted to mean full or maximal deployment where the maximum radius of the disk/spoiler is fully normal to the tangent surface of the projectile body and/or the greatest portion of the spoiler is exposed outside of the projectile body, unless context does not permit such interpretation.

During typical guidance operation the flow effector disks spin up to about 18,000 rotations per minute (rpm). Because during spin-up the spoiler may be temporarily/partially deployed at undesirable angles of projectile spin and may thus result in undesired steering forces/moments, preferably, the spin-up of the flow effector disk to full speed (i.e., to be matched to the same spin frequency as the rotation of the projectile) is accomplished within 20 projectile rotations. More preferably, the spin-up of the flow effector is accomplished within 10 projectile rotations. More preferably still, the spin-up is completed within 5 projectile rotations. Most preferably, spin-up completes within 1 projectile rotation.

The matching of the phase of a spinning disk to the phase of the rotation of the projectile as required to supply the desired steering force/moment is accomplished by slowing or speeding slightly the spin of the disk until the correct phase match is achieved. The feedback control system is responsible for controlling the motor using, in part, input from the feedback sensor or device, as described below.

Figure 5:
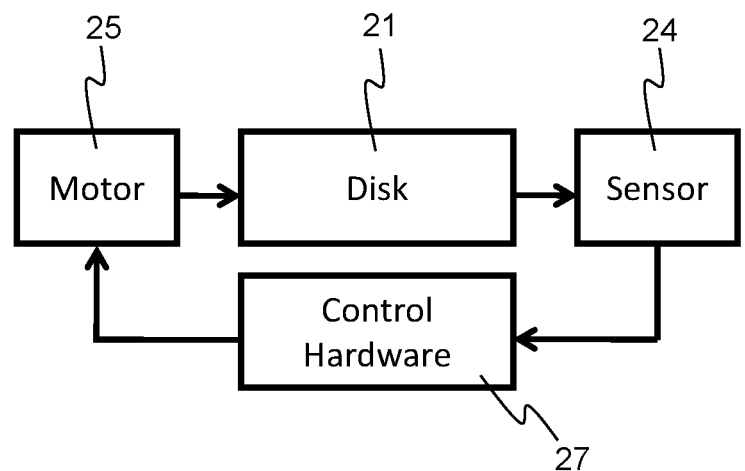
FIG. 5 is a block diagram of the basic feedback control system.

As described earlier, a projectile may be controlled by using one or more spinning disks of the present invention. Preferably, each spinning disk is controlled by its own independent control system. Each control system comprises, in addition to a single flow effector disk 21, a motor 25 and a feedback sensor or device 24. FIG. 5 is a block diagram of such an independent control system.

The motor 25 may be DC or AC, brushed or brushless, and must be capable of operating at rotational speeds equal to or greater than the maximum rotational frequency of the projectile (also called the projectile spin rate or spin frequency). Examples of suitable motors presently available include the Faulhaber SmartShell Series 2232 . . . B brushless DC servomotor, the MicroMo Electronics 2036 . . . B brushless DC servomotor, and the maxon motor EC 25 High Speed 250-watt motor.

While the feedback sensor or device 24 may take any of a number of forms, the primary requirement is that from its measurement the frequency and phase of the rotational position of the flow effector disk relative to an arbitrary position may be made, extracted, or derived. This sensor may take the form of a rotary encoder, a synchro (aka selsyn), a resolver, a rotary potentiometer, a rotary variable differential transformer, or any other sensor known in the art that fulfills the requirement given above.

As discussed above, a separate sensor or device 26 determines the spin frequency and spin orientation of the projectile and/or may provide other information critical to projectile guidance. This projectile spin sensor or device 26 may be an integral part of the system of the present invention or may be external to the system or even to the projectile with its information communicated through an on-board projectile data system (not shown). The data system can derive the spin frequency and spin orientation through on-board sensors and computing or via telemetered data collected elsewhere. In some embodiments, preferably, the spin frequency is determined by one or more MEMS gyroscopes and/or accelerometers.

Figure 6:
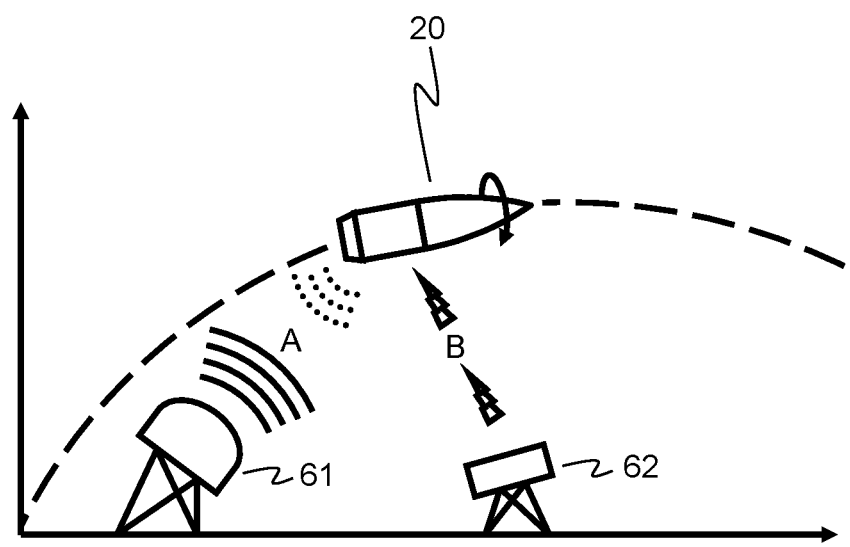
FIG. 6 illustrates telemetered sensor data.

The system of the present invention may also utilize and/or rely upon ground-based sensor data for projectile position, speed, orientation, and spin information, or any other information useful for guidance, target tracking, or unwanted-collision avoidance. Such ground-based sensor data may be acquired and/or transmitted by radar, lidar, ladar, directional RF, beam rider, or any other modality known in the art. Ground-based sensor data may be transmitted to the system of the present invention or to the projectile within which the system resides by telemetry. Telemetry can be part of the ground-based system such as part of the beam rider beam, or it can be separate using an RF link or similar. FIG. 6 illustrates the use of telemetered sensor data to provide guidance-critical information to projectile 20. In FIG. 6, radar system 61 (A) detects the position and speed of the projectile 20, which information is then (B) relayed back to the projectile 20 by RF or laser system 62

The system of the present invention preferably relies on a control algorithm to control the spin (phase and frequency) of the flow effector disk(s). The control algorithm may be implemented as an analog computer, as software in a microcontroller, or in any other fashion known in the art. The hardware or electronic circuitry for the controller is represented in the various figures (such as FIG. 2C, FIG. 5, FIG. 10A and FIG. 10B) by reference character 27.

The phase of the flow effector disks is controlled so that the deployment of the spoiler occurs in one of two fashions: either all of the flow effector disk spoilers deploy symmetrically and all steering forces and moments cancel, or the flow effector disk spoilers deploy asymmetrically and the forces and moments do not cancel, resulting in a net turning force. When the flow effector disk spoiler deployments are symmetrical, the flow effector disks are considered to be in-phase; when they are not symmetrical, they are considered to be phase shifted. The magnitude of the phase shift may be adjusted to create varying levels of control, with the maximum control occurring when the two or more flow effector disks are equally phased shifted from one another.

The frequency of the spin of the flow effector disks is nominally always the same as the spin frequency of the projectile. As a spin-stabilized projectile flies, frictional forces in the boundary layer around the projectile cause the spin frequency of the projectile to decrease. In some cases the spin frequency can be adjusted through the use of spin frequency adjustment mechanisms such as deployable flow effectors, thrusters or reaction wheels. As the projectile spin frequency changes, the sensor that determines the spin frequency and spin orientation measures the change in spin frequency and spin orientation due to any spin frequency adjustment mechanism.

Figure 3A:
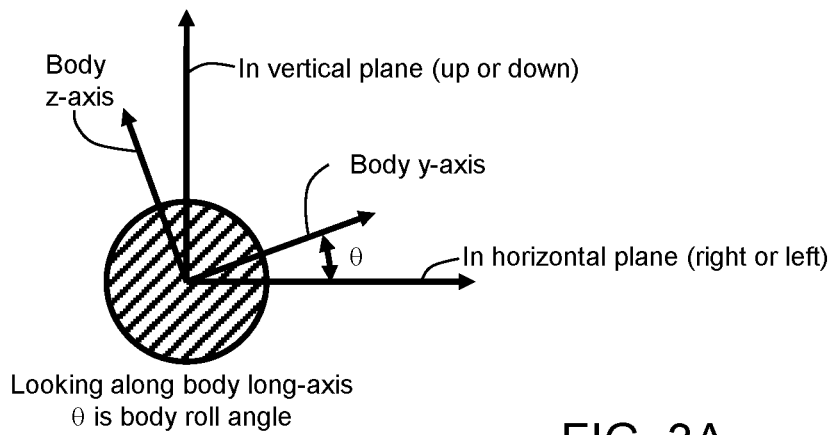
FIG. 3A is a geometric illustration of the roll angle of a projectile.
Figure 3B:
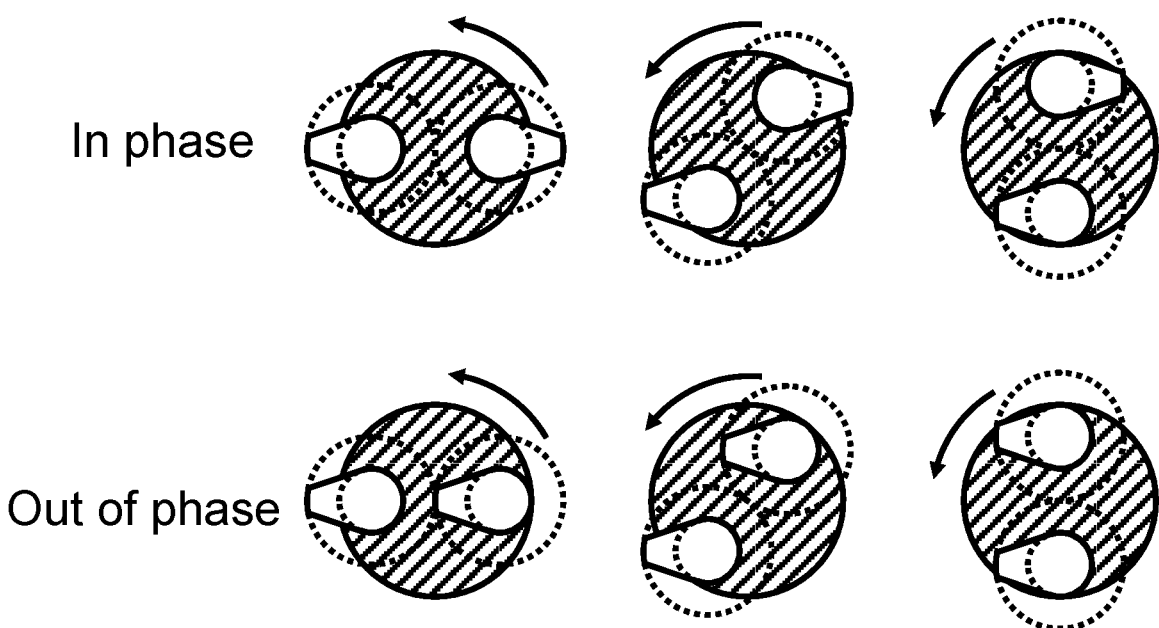
FIG. 3B illustrates in phase and out of phase spoiler deployments.

FIG. 3A is a geometric illustration of the roll angle θ of a spin-stabilized projectile. FIG. 3B illustrates in phase and out of phase spoiler deployments as the projectile rotates. The forces or moments exerted upon the projectile by the in phase spoilers effectively cancel each other out, thus having no steering effect on the projectile, while out of phase deployment may effectively steer the projectile.

Figure 4:
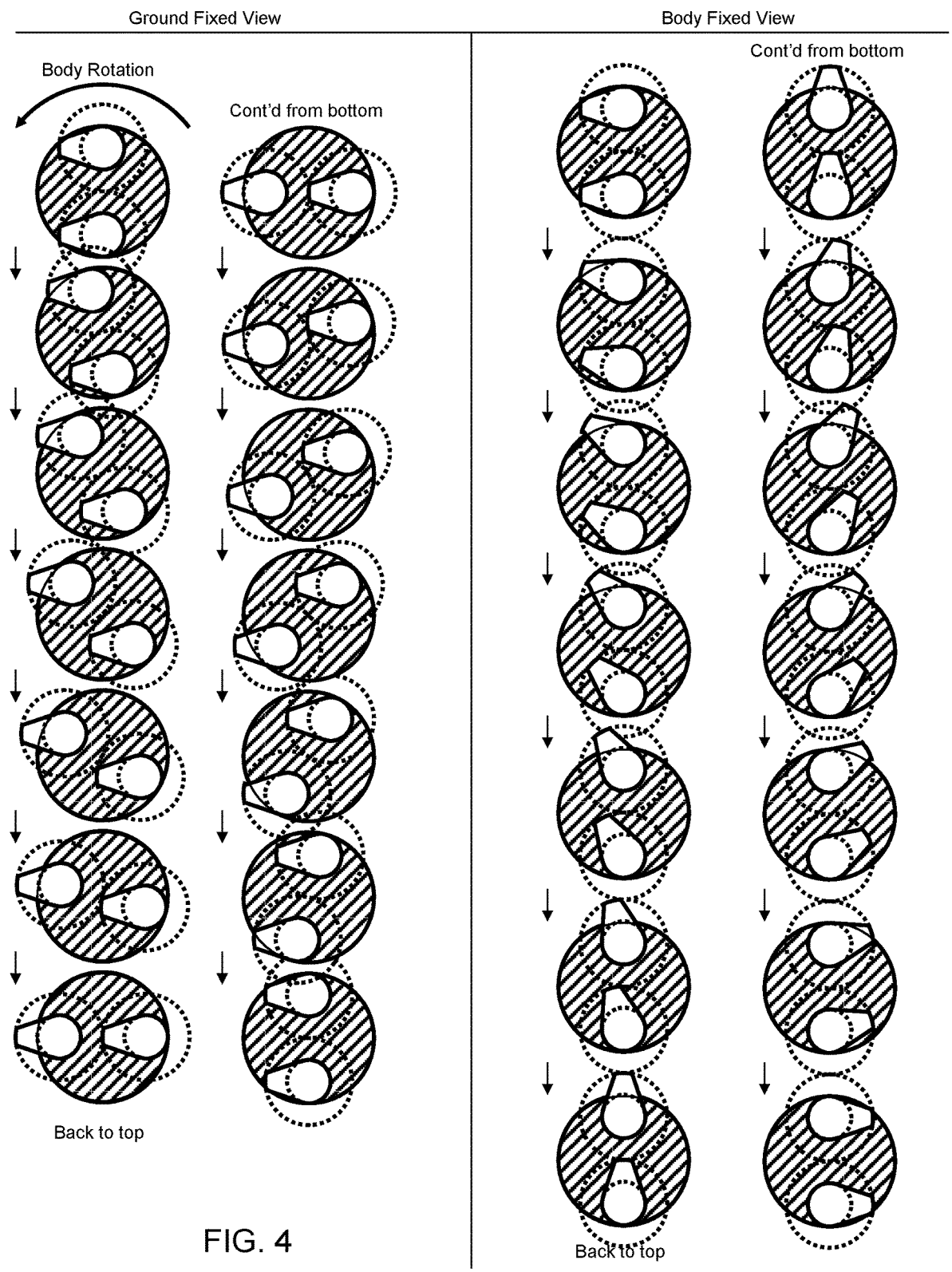
FIG. 4 shows a two-column table of spoiler deployment as a function of projectile roll angle for both a "ground fixed view" (left column) and a "body fixed view" (right column).

FIG. 4 compares body fixed reference frame, ground fixed reference frame and body fixed spoiler deployment orientation, along with up, down, left and right. Thus on the left column of FIG. 4 it can be seen that the two disks are spinning out of phase with one another to exert concerted steering forces/moments on the projectile as it spins (counterclockwise in the perspective illustrated). Only one half rotation cycle of the projectile is shown; the spoiler on the bottom of the projectile at the beginning (top-left of the left column) is the spoiler on the top of the projectile at the end (bottom-right of the left column). The right column similarly shows only one half of the cycle, and with the two disks out of phase with each other, but from the reference frame of the spinning projectile.

The instantaneous flow effector disk frequency may not be the same as the instantaneous projectile spin frequency. This may be due to a number of situations, including: (1) during the spin-up phase of the flow effector disk mechanism; (2) during phase shifts to reorient the deployment of the spoilers in preparation for a turning maneuver; (3) during control ramp-up from symmetrical to asymmetrical configurations; (4) during changes from one asymmetrical configuration to a different asymmetrical configuration; (5) during control ramp-down from asymmetrical to symmetrical configuration; and (6) during the spin-down phase of the flow effector disk mechanism.

In typical embodiments of the present invention, the projectile steering system of the present invention will be implemented in a projectile launched from a tube, which can be a mortar tube, a cannon, a gun, a tank turret, a launching tube aboard a naval vessel, a personal rocket launcher or RPG launcher, or similar. The steering system of the present invention begins operation prior to the projectile's loading into the tube of the launch system. During the earliest phase, the system may check for correct function of the electrical components, it may simply perform software checks, and/or it may receive guidance information from the personnel that are utilizing the projectile. The system pre-launch is considered aware, active and ready, but does not perform any body-external functions. Once loaded into the tube of the launch system, the steering system awaits launch from the tube or continues performing diagnostic functions. If during a pre-launch diagnostic check the system of the present invention determines that one or more spinning disk controllers are faulty or inoperable, the system of the present invention may, for example, transmit an alert message or signal that will permit aborting of the firing and replacement with a more fully operable round.

During launch the steering system of the present invention performs no actions. The spinning disks are at this point safely locked or braked within the surface of the projectile such that the spoilers are not and/or cannot be deployed during launch. This prevents damage to the system from launch-related accelerations.

Immediately after launch, the steering system of the present invention may make additional measurements and/or begin sensor acquisition of the projectile position, projectile velocity, projectile spin frequency and projectile spin orientation. Once course correction is determined through the sensors, a control algorithm determines the amount of correction needed and initializes the spinning of the flow effector disk system. The flow effector disk system may be spun-up immediately or the spin-up may be delayed until significant course correction is required, as signaled by an internal determination of the projectile's sensor systems or as signaled by external guidance commands telemetered to the projectile. This delay in activation of the flow effector disk system is advantageous because when spoilers are deployed outside the surface of the projectile, the flow effector disk system is an intermittent source of drag whenever the flow effector disks are spinning relative to the body. This drag reaction is due to the periodic deployment of the flow effector disk spoilers. To avoid the drag penalty, the guidance system architecture is preferably designed to wait for a threshold amount of course correction to be required prior to spin-up of the flow effector disks.

In addition to a startup delay, the system may be designed to spin-down the flow effector disks during the flight if no course corrections are required. The disks of the present invention may then later spin-up again as required.

Figure 7A:
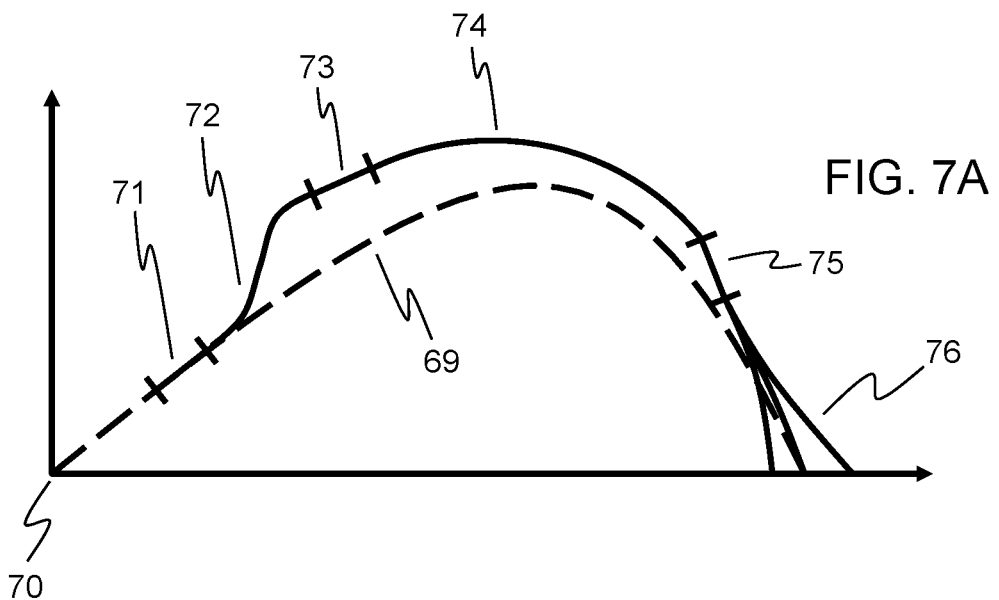
FIGS. 7A-7C illustrate projectile trajectories for three different deployment scenarios.
Figure 7B:
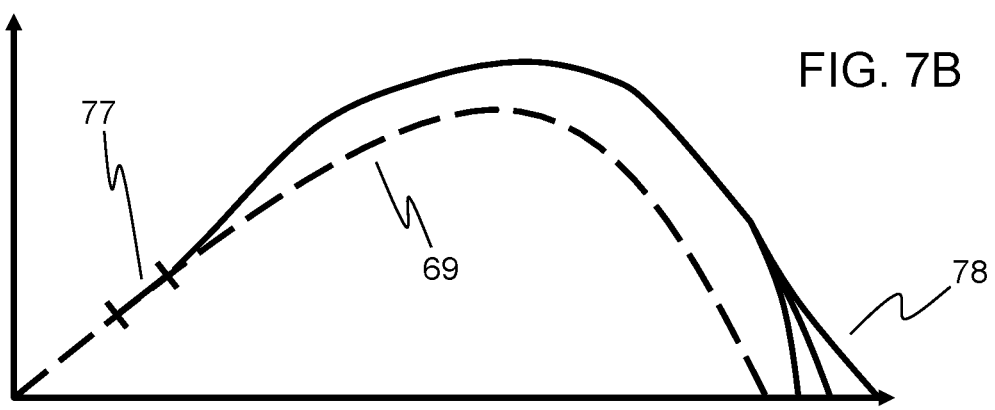
Figure 7C:
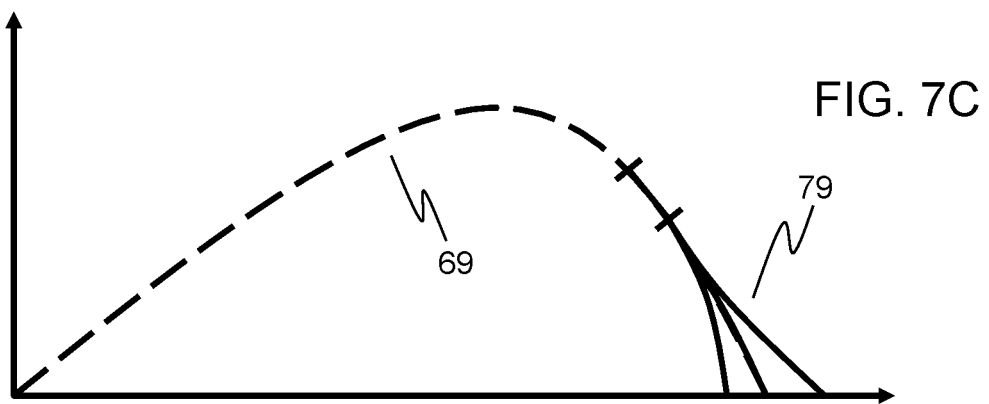

FIGS. 7A-7C illustrate projectile trajectories for three of the possible modes of the invention's operation that impact the range of a spinning disk steered projectile. In each figure, the dashed line 69 represents the trajectory of an unguided projectile. In FIG. 7A, the disks are spun-up to operating speed 71 shortly after launch 70 and a correction 72 is made to the trajectory early in the fly-out. The disks are then spun-down 73 and stowed to minimize the drag penalty due to the spoilers operating when no steering commands are desired. The disks are then spun-up again 75 prior to the endgame maneuvering 76. This scenario presents the possibility of minimizing system drag during the high altitude phase of flight 74. FIG. 7B illustrates a case in which the disks are spun-up 77 early in the fly-out. Maneuvering is available for nearly the entire duration of the trajectory and the potential to increase range 78 via continuous control input is available. FIG. 7C illustrates how the spinning disks may be used during only the endgame phase 79 of the flight to provide impact point correction only. This is the mode where the power consumption of the steering system is lowest. In each of these three figures, the region between the lines perpendicular to the trajectory lines indicates that the spinning disks are spinning up or spinning down. The spin-up and spin-down phases in the present invention correspond to stowing and deploying of a conventional control actuation system.

For a steering system with two flow effector disks, system pointing from an unpointed mode can be performed by two steps: first, the periodic deployment of the spoilers is oriented so that each flow effector disk spoiler deploys normal to the desired turning plane. Second, one flow effector disk's phase is shifted positive and one flow effector disk's phase is shifted negative. The direction of the shifts results in a net force and/or moment in the direction of the desired turn. The phases can be adjusted until they are exactly out of phase, which will result in the maximum possible steering force and/or moment. See FIGS. 8A-E.

Figure 8A:
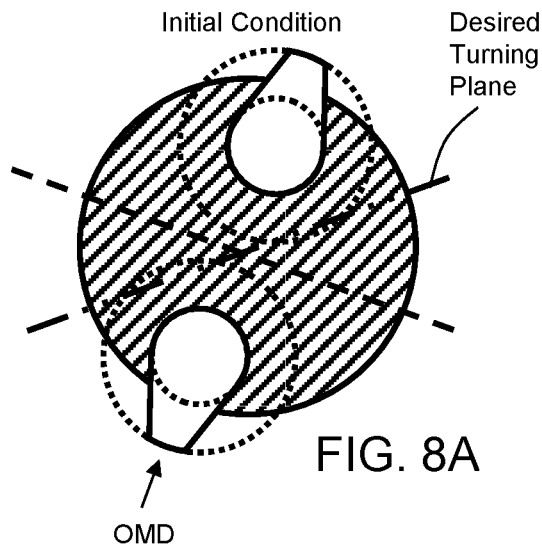
FIGS. 8A-E illustrate plane shift and accompanying phase shifts.
Figure 8B:
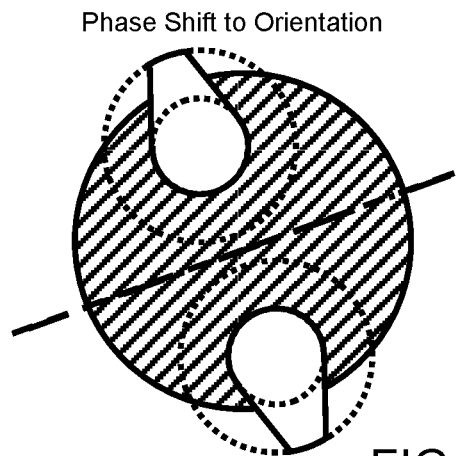
Figure 8C:
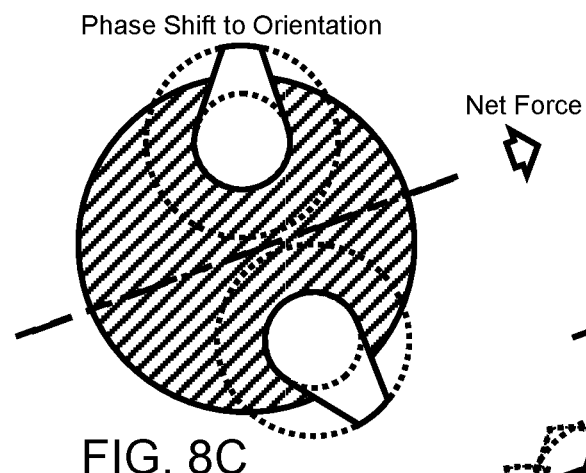
Figure 8D:
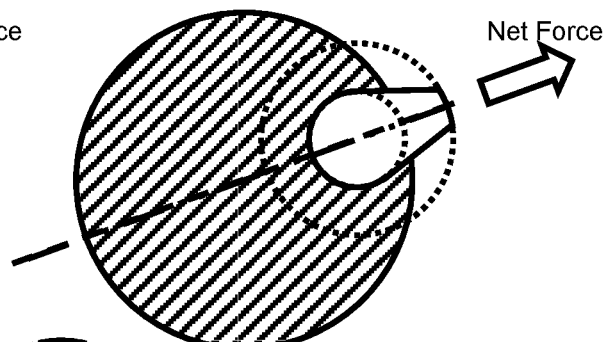
Figure 8E:
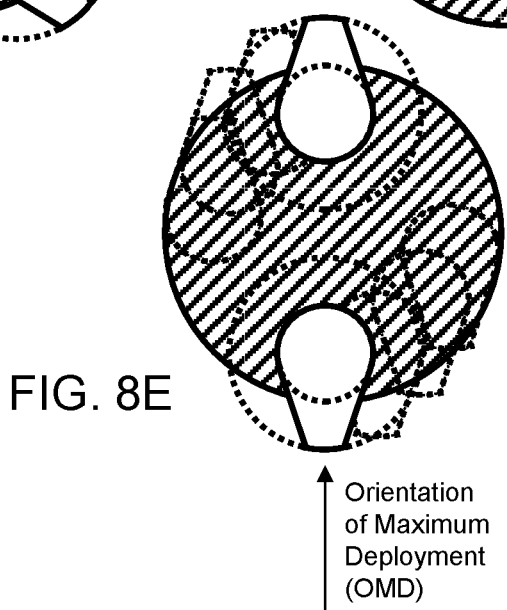
Figure 8F:
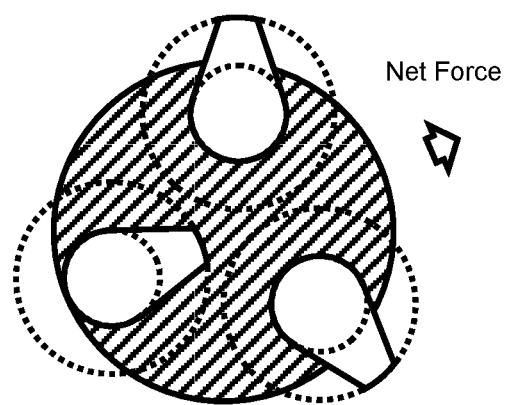
FIGS. 8F-G illustrate an embodiment having three spinning disks.
Figure 8G:
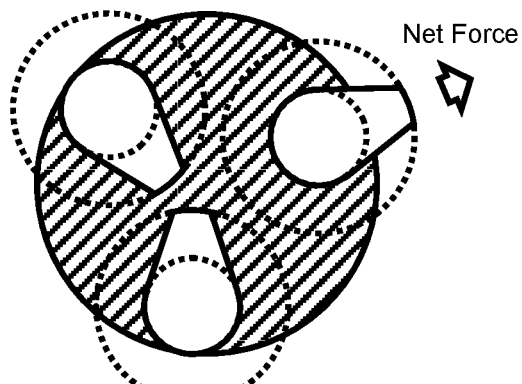
Figure 9:
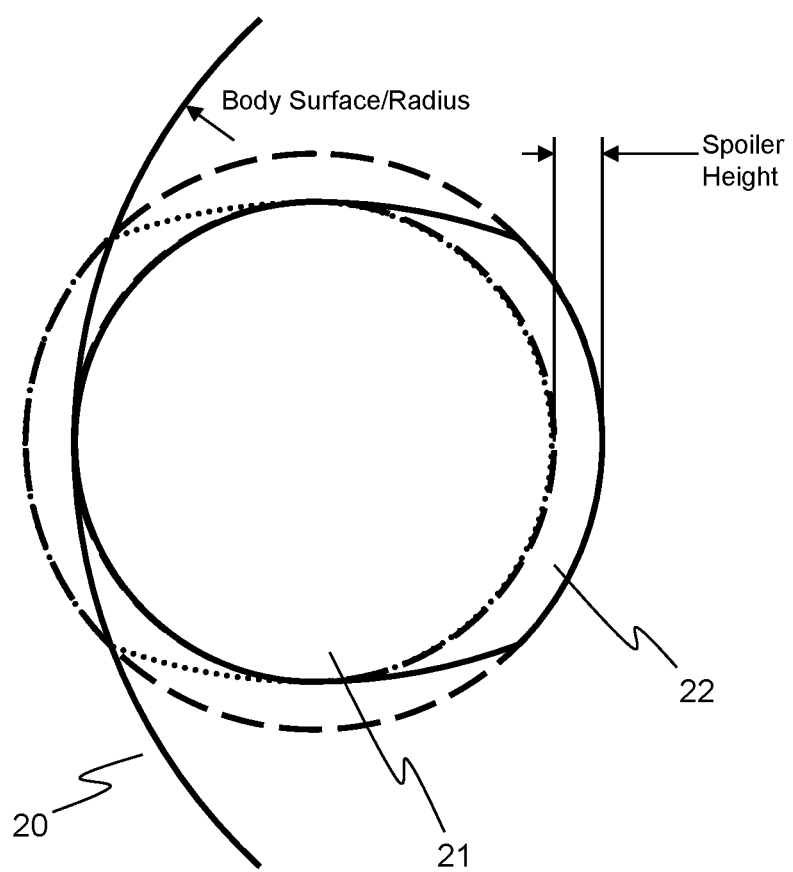
FIG. 9 illustrates the proportionality of the flow effector disk's spoiler height to the radius of the projectile body surface.

For a steering system that uses three flow effector disks, system pointing from an unpointed mode can be performed by two steps: first, the periodic deployment of the spoilers is oriented such that one of the spoilers is maximally deployed parallel to the desired turning plane. Second, the phase of the other two flow effector disks are shifted towards either three spoilers deploying in the direction of the turn or two in the direction of the turn and one opposite. See FIGS. 8F-G.

For an arbitrary number of flow effector disks, the system behavior for even numbers of flow effector disks is similar to the two-spoiler case, and for odd numbers of flow effector disks, the system behavior is similar to the three-spoiler case.

The turning plane is rotatable. That is, if a turn in one plane is ongoing and a new turning plane is required that is a small rotation from the ongoing turning plane, the system can simply adjust the phase of all the spoilers to accommodate the new turning plane.

FIG. 8 illustrate plane shift and accompanying phase shifts.

The turning plane is reversible. That is, if a turn in plane of one sign is ongoing and the opposite sign turn is required, the system can adjust the phase of all the spoilers to reverse the sign of the turn, in the original turning plane.

An in-plane sign change has accompanying phase shifts.

Once desired course correction is realized, spin down or stoppage of the flow effector disks preferably occurs to prevent passive or inadvertent course change and to reduce undesirable drag. This incorporates the use of sensors and/or the use of hard stops (not shown) placed such that the spoilers of the rotating flow effector disks cannot protrude outside the body. The means of braking or stopping the projectile may be any known in the art, and may comprise, for example, locking pins which push through holes in the disks to lock them appropriately into place.

Figure 10A:
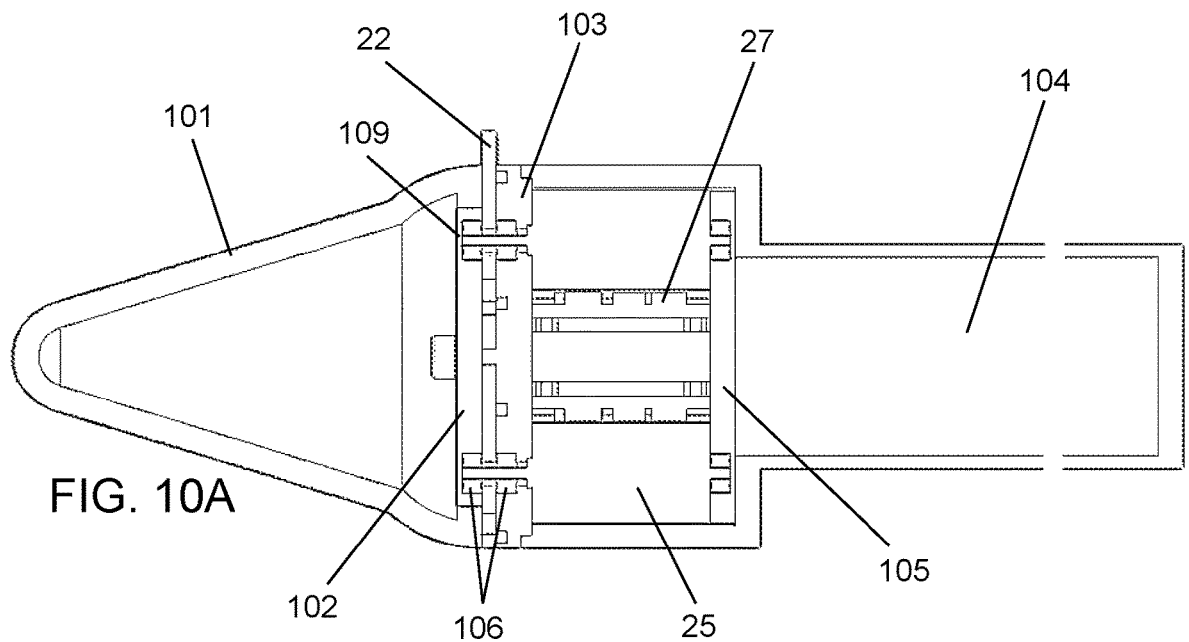
FIGS. 10A, 10B, and 10C show, respectively, a side cutaway view, a ¾ cutaway view, and a front cutaway view of a fuze kit embodiment of the present invention.
Figure 10B:
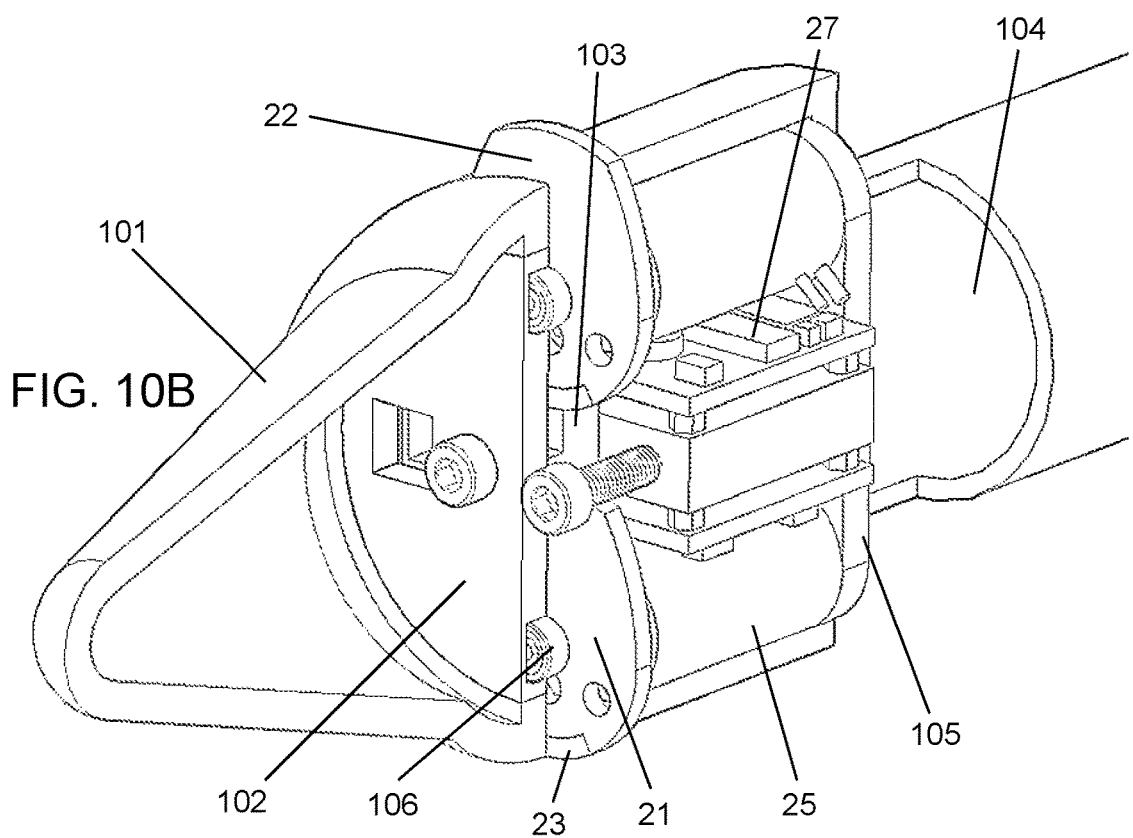
Figure 10C:
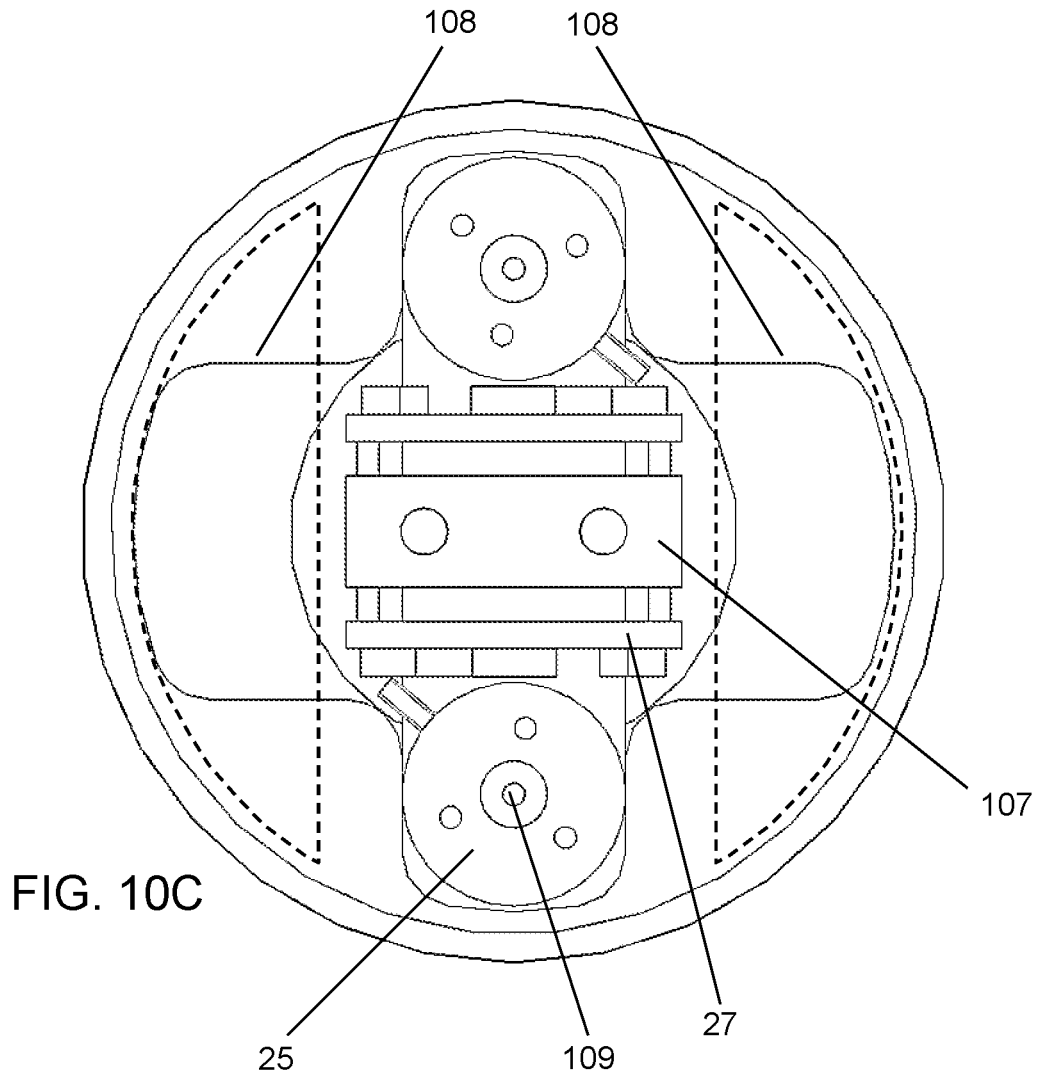

FIGS. 10A-10C illustrate the embodiment of the present invention wherein the system of spinning disks is built into a fuze or nose kit for modular implementation with existing or future projectile rounds. The modified nose 101 may be filled with sensor apparatus (not shown) such as a radome, optical or infrared sensors or camera, gyroscopes and/or accelerometers (preferably MEMS-based), telemetry system (s), computers, etc. Inside the opposite end of the fuze or nose kit is a battery well 104 for storage of a battery or other power source to supply power to motors 25 and control electronics 27. Other electronics or sensors or computers may also be stored inside battery well 101. Motors 25 drive spoiler disks 21 each having, as previously discussed, spoilers 22 and counterweights 23. The motors 25 may be of any type suggested previously or any suitable type known in the art. Spin of the disks 21 is facilitated by Conrad bearings 106 which connect disk axles 109 to nose mounting plate 102 and spoiler bulkhead 103. On the opposite side, motors attach to internal support bulkhead 105. The nose mounting plate 102 bolts through the spoiler bulkhead to the support column 107. Control electronics boards 27 receive input from sensors (not shown in FIG. 10) and provide commands to motors 25. An independent control electronics board is supplied to each motor/disk; alternately, one electronics board may provide commands to all motors/disks, but multiple such boards may provide redundancy to the system. With some reconfiguration/resizing, additional motors/disks may be placed in unused space at motor cross section 108; or such space may be filled by other systems or components. While FIG. 10 illustrate an embodiment comprising only 2 motors/disks, any number of such motors/disks may be employed to supply control to a projectile; preferably, the motors/disks are arranged to be evenly spaced, radially, within the projectile to provide rotational weight balance.

This disclosure now touches on the important problem of flow effector disk geometry and its effect on motor load torque ripple. Due to the extremely high rotation speed of the projectile, centrifugal forces (CF) will be very high on the flow effector disk system and its various components. The CF increases linearly as position moves radially outward from the axis of rotation of the body of the projectile. The CF can cause an undesirable moment on the flow effector disk that the motor driving the disks sees as varying load (torque ripple). This torque ripple must not exceed the torque performance of the motor. If the torque ripple caused by the disk spinning offset from the axis of rotation of the body of the projectile can be reduced, then power requirements will be reduced, and bandwidth of the actuation system will be increased.

The flow effector disk of the present invention comprises disk that spins around its own center and which is shaped to include an extended tab or spoiler that has a maximum radius greater than the disk's minimum radius over some fraction—preferably less than one half—of the circumference of the disk. The axis of the flow effector disk is offset from the axis of the projectile body to allow just the spoiler to be intermittently deployed beyond the outer surface of the projectile body as the disk rotates relative to the body of projectile. If the disk were manufactured from a uniform-thickness monolithic material, it would be imbalanced due to the additional weight of the spoiler tab. Simple balance can be achieved by adding mass (increased thickness or denser material) on the non-tab half of the disk to balance the disk about the axis of disk rotation. This ensures the center of mass of the disk is on the axis of rotation of the disk relative to the projectile body. Due to the radially varying centrifugal forces on the disk caused by disk axis being offset from the axis of rotation of the projectile body, a simple mass balanced disk is not sufficient to eliminate all torque ripple.

The cause of the torque ripple on the simple mass balanced disk is due to the difference of mass distribution from the tab half and the counterbalance half of the disk. The force on any infinitesimal element of the disk is proportional to the element's radius from the axis of rotation of the body of the projectile. The moment generated by the infinitesimal element is the cross product of the element mass times the acceleration vector (from the projectile body center to the element) crossed with the moment arm vector (from the disk axis to the element). Thus the moment generated by each infinitesimal element of the disk varies with the rotation of the disk relative to the projectile body.

To balance these moments caused by radial varying CF on the mass distribution of the disk, an additional constraint to simple mass balance of the disk is required: at any possible rotational position of the disk relative to the projectile body, the integral of the moment of infinitesimal elements over the volume of the disk must result in zero moment.

The two constraints are not trivial, but it is physically possible to meet this constraint and still have favorable disk geometry. First, assume the disk is axle-symmetric along a plane that passes through the axis of rotation and the center of the spoiler tab's arc, and then divide the disk into two halves on a line perpendicular to the axis of symmetry passing through the axis of rotation, forming a tab half and a counter-balance half. The above requirements can be met by designing a disk that is both simple mass balanced and for which the tab half and counter-balance half of the disk have equal mass moments of inertia about the disk axis of rotation.

If the above two constraints (simple mass balance and equal mass moments of inertia of the tab half and counter-balance half) are met, the flow effector disk will have zero torque ripple. Any realized torque ripple will be a result of manufacturing tolerance. From an engineering perspective, the cost of manufacture, cost/performance of motor cost and the system performance requirements can then be balanced.

With regard to disk geometry and bandwidth, the spinning flow effector disks preferably have a mass moment of inertia comparable to the mass moment of inertia of the rotor of the selected motor. This matching of disk inertia to rotor inertia ensures stable control while allowing for maximum bandwidth. Many of the motors capable of rotation speeds that meet the system frequency requirement have extremely high potential angular accelerations. Since the concept for spinning disk control is a phase shift of the disk rotation relative to the projectile body rotation (in the global reference frame), the spinning disks preferably have bandwidth at or above the frequency of the guidance and control modules' ability to feed the spinning disks control data.

Figure 11:
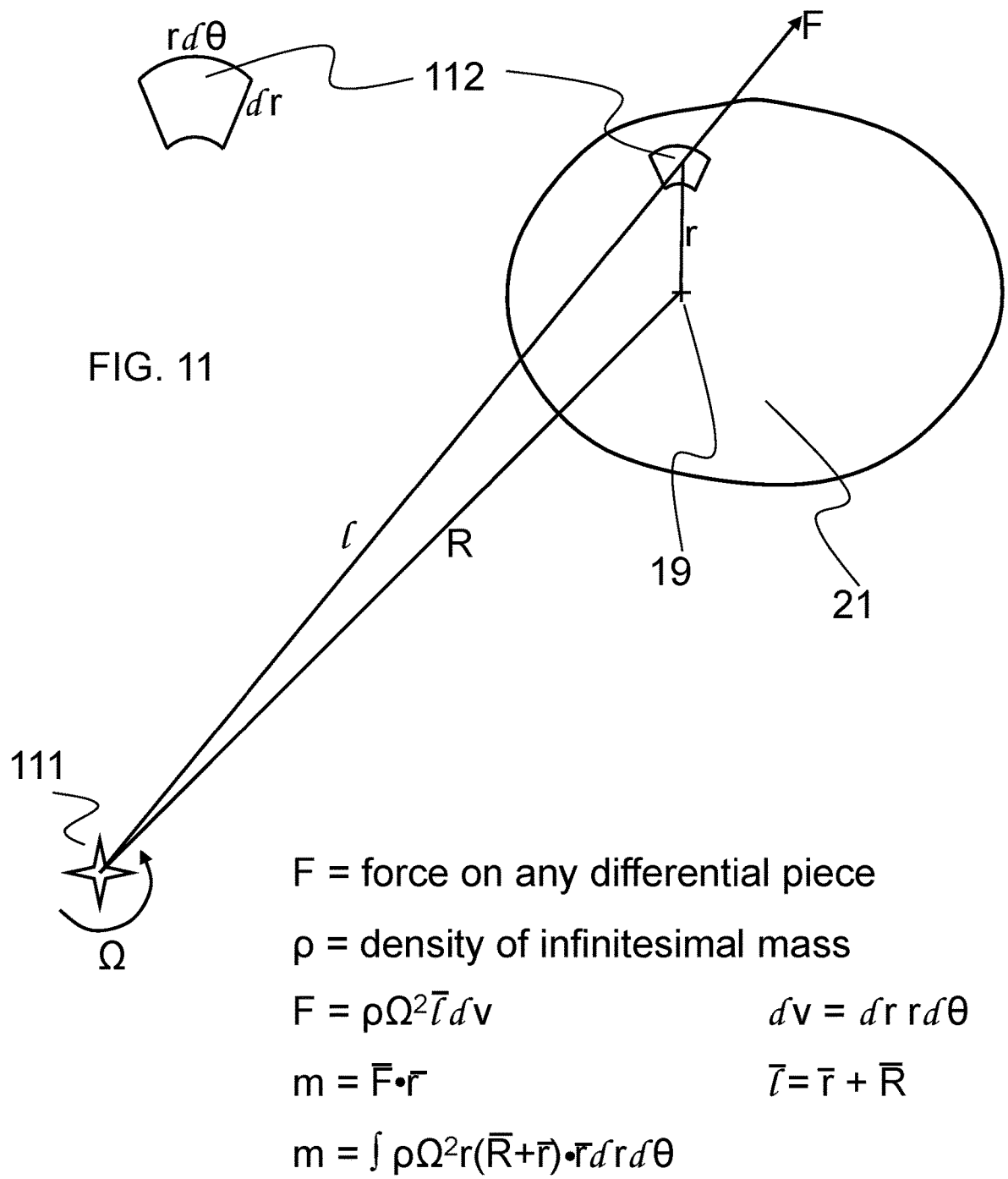
FIG. 11 depicts the rotating disk of various embodiments of the present invention, the rotating disk having an arbitrary differential piece, and embodies the condition wherein the mass distribution of the spinning disk results in zero moment about the disk center when integrated in the rotating reference frame of the projectile for all orientations of the disk relative to the body of the projectile.

FIG. 11 shows disk 21 having radius r, the axle 19 of which is placed at a distance R from the center 111 of projectile rotating at a Ω. An arbitrary differential piece 112 of the disk 21, having differential height dr and differential angular width rdθ, will be at a distance l from center 111 and its infinitesimal mass will have density ρ. The force F then exerted upon that differential mass will be $\rho \Omega^2 ldr$. The general condition described above (i.e., that the mass distribution of the spinning disk results in zero moment about the disk center when integrated in the rotating reference frame of the projectile for all orientations of the disk relative to the body of the projectile) is met according to the moment equation given in FIG. 11.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. A guidance system for a projectile comprising:
at least one spinning disk having an axle, the spinning disk comprising or being asymmetrically shaped to comprise at least one flow-effecting spoiler, the axle of the spinning disk being positioned within a projectile such that, by the rotation of the spinning disk, the spoiler is adapted to deploy so as to protrude from an outer surface of the projectile only for some angles of spin of the spinning disk so as to exert a steering force and/or moment on the projectile;
at least one sensor having a signal corresponding to a measurement of spin frequency and/or spin orientation of the projectile; and
a controller adapted to adjust the steering force and/or moment on the projectile based at least in part on the signal of the at least one sensor.

2. The guidance system of claim 1, wherein the projectile is a spin-stabilized projectile selected from the group consisting of 40 mm projectiles, 60 mm projectiles, 81 mm projectiles, 105 mm projectiles, 120 mm projectiles, 155 mm projectiles, and self-propelled projectiles.

3. The guidance system of claim 2, wherein the the at least one spinning disk, the at least one sensor and the controller are comprised in a modular fuze kit adapted to be attached to a projectile.

4. The guidance system of claim 3, wherein projectile comprises an even number of spinning disks each comprising or being asymmetrically shaped to comprise at least one flow-effecting spoiler, and the spoilers are deployed periodically by the spinning of the disks, and the orientation of the periodic deployment of the spoilers is such that each spoiler maximally deploys normal to a desired turning plane and one flow effector disk's phase is shifted positive and an opposite flow effector disk's phase is shifted negative resulting in a net steering force and/or moment on the projectile.

5. The guidance system of claim 3, wherein the projectile exhibits a circular error probable (CEP) distance of less than 50 meters for projectile ranges greater than 18 kilometers.

6. The guidance system of claim 5, wherein the controller further comprises a processor adapted to control the spin of the at least one spinning disk based at least in part on the at least one sensor signal by changing the phase and/or frequency of the spin of the at least one spinning disk.

7. The guidance system of claim 6, further comprising a telemetry system adapted to transmit data between the guided projectile and a ground-based sensor system.

8. A method of guiding a projectile comprising:
spinning up at least one asymmetric spinning disk comprising or shaped to comprise a flow-effecting spoiler to substantially the same rotational speed as the spin of the projectile, the spinning disk being housed within the projectile and oriented normal to the direction of travel;
measuring with at least one sensor spin frequency and/or spin orientation of the projectile; and
adjusting, with a controller, the speed of the spin of the at least one spinning disk such that the flow-effecting spoiler is maximally deployed to protrude outside of the outer surface of the projectile during a desired phase of rotation of the projectile and a steering force or moment is exerted on the projectile based at least in part of the measured sensor spin frequency and/or spin orientation.

9. The method of claim 8, wherein the guided projectile is a spin-stabilized guided projectile selected from the group consisting of 40 mm projectiles, 60 mm projectiles, 81 mm projectiles, 105 mm projectiles, 120 mm projectiles, 155 mm projectiles, and self-propelled projectiles.

10. The method of claim 9,
wherein the at least one asymmetric spinning disk, the at least one sensor and the controller are comprised in a modular fuze kit adapted to be attached to a projectile.

11. The method of claim 10,
wherein the controller further comprises a processor adapted to calculate the adjustment based at least in part on the measured spin frequency and/or spin orientation of the projectile.

12. The method of claim 9, wherein the use of the method results in the projectile having a circular error probable (CEP) of less than 50 meters for projectile ranges greater than 18 kilometers.

13. The method of claim 8, further comprising the step of transmitting data with a telemetry system between the guided projectile and a ground-based sensor system.

14. A guidance system for a projectile comprising;
at least one spinning disk having an axle, the spinning disk comprising or being asymmetrically shaped to comprise at least one flow-effecting spoiler, the axle of the spinning disk being positioned within a projectile such that, by the rotation of the spinning disk, the spoiler is adapted to deploy to protrude from an outer surface of the projectile only for some angles of spin of the spinning disk so as to exert a steering force and/or moment on the guided projectile;
at least one sensor having a signal corresponding to a measurement of spin frequency and/or spin orientation of the projectile;
a controller adapted to adjust the steering force and/or moment on the guided projectile; and
a telemetry system adapted to transmit data between the projectile and a ground-based sensor system
wherein at least the at least one spinning disk, the at least one sensor and the controller are comprised in a modular fuze kit adapted to be attached to the projectile.

15. The guidance system of claim 14, wherein the projectile is a spin-stabilized guided projectile selected from the group consisting of 40 mm projectiles, 60 mm projectiles, 81 mm projectiles, 105 mm projectiles, 120 mm projectiles, 155 mm projectiles, and self-propelled projectiles.

16. The guidance system of claim 15, wherein the projectile exhibits a circular error probable (CEP) distance of less than 50 meters for projectile ranges greater than 18 kilometers.

17. The guidance system of claim 15, wherein the projectile comprises an even number of spinning disks each comprising or being asymmetrically shaped to comprise at least one flow-effecting spoiler, and the spoilers are deployed periodically by the spinning of the disks, and the orientation of the periodic deployment of the spoilers is such that each spoiler maximally deploys normal to a desired turning plane and one flow effector disk's phase is shifted positive and an opposite flow effector disk's phase is shifted negative resulting in a net steering force and/or moment on the guided projectile.

18. The guidance system of claim 15, wherein the projectile comprises an odd number of spinning disks, three or greater, each comprising or being shaped to comprise at least one flow-effecting spoiler, and the spoilers are deployed periodically by the spinning of the disks, and the orientation of the periodic deployment of the spoilers is such that each spoiler maximally deploys normal to a desired turning plane and one flow effector disk's phase is shifted positive and an opposite flow effector disk's phase is shifted negative resulting in a net steering force and/or moment on the guided projectile.

19. The guidance system of claim 18, wherein the controller further comprises a processor adapted to control the spin of the at least one spinning disk based at least in part on the measured spin frequency and/or spin orientation by changing the phase and/or frequency of the spin of the at least one spinning disk.

20. The guidance system of claim 19, wherein the guidance system is adapted to operate to at least begin spinning the at least one spinning disk and perform measurements with the at least one sensor immediately after launch or firing of the projectile, but the at least one spinning disk is locked or braked within the projectile prior to launch or firing.

* * * * *